(12) United States Patent
Fukuoka et al.

(10) Patent No.: US 9,806,323 B2
(45) Date of Patent: Oct. 31, 2017

(54) SEALING BODY FOR SEALED BATTERY AND SEALED BATTERY

(71) Applicant: Sanyo Electric Co., Ltd., Daito-shi, Osaka (JP)

(72) Inventors: Takahiro Fukuoka, Tokushima (JP); Shuichi Yamashita, Tokushima (JP); Yuma Yamaguchi, Tokushima (JP); Yuki Iida, Tokushima (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/034,001

(22) PCT Filed: Oct. 27, 2014

(86) PCT No.: PCT/JP2014/005428
§ 371 (c)(1),
(2) Date: May 3, 2016

(87) PCT Pub. No.: WO2015/068353
PCT Pub. Date: May 14, 2015

(65) Prior Publication Data
US 2016/0285071 A1    Sep. 29, 2016

(30) Foreign Application Priority Data
Nov. 5, 2013  (JP) ................................. 2013-229159

(51) Int. Cl.
*H01M 2/34* (2006.01)
*H01M 2/02* (2006.01)
(Continued)

(52) U.S. Cl.
CPC ............. *H01M 2/345* (2013.01); *B23K 26/21* (2015.10); *B23K 26/32* (2013.01); *H01M 2/027* (2013.01);
(Continued)

(58) Field of Classification Search
CPC .......... H01M 10/052; H01M 10/0525; H01M 2/0408
See application file for complete search history.

(56) References Cited

U.S. PATENT DOCUMENTS 6,242,126 B1    6/2001  Mori et al.
2010/0247984 A1*  9/2010  Yamashita ............ H01M 2/027
                                                                  429/53

FOREIGN PATENT DOCUMENTS

JP    6-196150 A    7/1994
JP    7-105933 A    4/1995
(Continued)

OTHER PUBLICATIONS

International Search Report dated Jan. 13, 2015, issued in counterpart International Application No. PCT/JP2014/005428 (2 pages).

*Primary Examiner* — Olatunji Godo
(74) *Attorney, Agent, or Firm* — Westerman, Hattori, Daniels & Adrian, LLP

(57) ABSTRACT

A sealing body according to the present invention is sealing body for a sealed battery including conductive terminal cap, a conductive explosion-proof valve electrically connected to the terminal cap, a conductive terminal plate having an abutting surface abutting the explosion-proof valve, and an insulating plate disposed between the explosion-proof valve and the terminal plate. A welded part between the explosion-proof valve and the terminal plate is formed in the inner part of the abutting surface, and the plan-view shape of the welded part is a shape defining an enclosed region, a C-shape, or a spiral shape. A notch part surrounding the welded part is formed in the terminal plate. The breaking pressure of the welded part is higher than the breaking pressure of the notch part.

12 Claims, 1 Drawing Sheet

(51) Int. Cl.
*H01M 2/04* (2006.01)
*H01M 2/12* (2006.01)
*B23K 26/21* (2014.01)
*B23K 26/32* (2014.01)

(52) U.S. Cl.
CPC ....... *H01M 2/0413* (2013.01); *H01M 2/1241* (2013.01); *H01M 2/1247* (2013.01)

(56) References Cited

FOREIGN PATENT DOCUMENTS

| | | |
|---|---|---|
| JP | 8-115714 A | 5/1996 |
| JP | 9-129195 A | 5/1997 |
| JP | 10-21892 A | 1/1998 |
| JP | 2005-11673 A | 1/2005 |
| JP | 2014-127284 A | 7/2014 |

* cited by examiner

SEALING BODY FOR SEALED BATTERY AND SEALED BATTERY

TECHNICAL FIELD

The present invention relates to sealing body having a safety mechanism that cuts off current when the pressure in a battery reaches a predetermined value, and a sealed battery employing this.

BACKGROUND ART

In recent years, there have appeared many mobile or portable electronic devices such as cell-phones including smartphones, potable personal computers, PDAs, and portable game machines. Sealed batteries are used as driving power sources for these. Among sealed batteries, non-aqueous electrolyte secondary batteries capable of repeated charge and discharge are particularly widely used because of their lightweight and high capacity.

If a sealed battery is overcharged due to misuse, charger malfunction, or the like, the pressure in the battery increases with the decomposition of electrolyte. If the sealed battery continues to be overcharged, owing to the protrusion of a sealing body of the sealed battery, the breakage of an outer can, or the like, electrolyte spatters around the sealed battery and damages an electronic device housing the sealed battery. So, the sealed battery is provided with a safety mechanism that cuts off current when the pressure in the battery reaches a predetermined value.

PTL 1 discloses a safety mechanism that, when the pressure in a battery reaches a predetermined value, cuts off current by breaking a welded part between a partition wall in a sealing body and a welded plate connected to a conductive lead of an electrode plate. PTL 2 discloses a safety mechanism that, when the pressure in a battery reaches a predetermined value, cuts off current by breaking not a welded part between an upper metal foil and a lower metal foil in a sealing body but a thin, easily-breakable part provided in the lower metal foil. PTL 3 discloses laser welding an upper metal foil and a lower metal foil in a sealing body.

CITATION LIST

Patent Literature

PTL 1: Japanese Published Unexamined Patent Application No. 6-196150
PTL 2: Japanese Published Unexamined Patent Application No. 9-129195
PTL 3: Japanese Published Unexamined Patent Application No. 10-21892

SUMMARY OF INVENTION

Technical Problem

When breaking a welded part between two metal foils such as a partition wall and a welded plate as described in PTL 1, there is a problem in that it is difficult to suppress variation in breaking pressure. Because of a configuration in which a welded part between a partition wall and a welded plate is broken, the welding strength cannot be increased. Therefore, there is a problem in that, when the sealed battery is subjected to a shock such as a vibration or a drop, the welded part breaks.

If, instead of breaking a welded part between two metal foils such as a partition wall and a welded plate, a thin, easily-breakable part provided in the lower metal foil is broken as described in PTL 2, it seems that the above problems are solved. However, the pressure value in a sealed battery at which current should be cut of varies depending on its use. Therefore, according to the art disclosed in PTL 2, the thickness of the thin, easily-breakable part of the lower metal foil needs to be changed for each use of the sealed battery. A different lower metal foil is needed for each use of the sealed battery. Therefore, the manufacturing process of a sealed battery is complicated, and the manufacturing coat increases. Such a problem is not discussed at all in PTLs 2 and 3.

The present invention is made in consideration of the above, and it is an object of the present invention to provide a sealing body having a safety mechanism that has variation in current cutoff pressure is small and the current cutoff pressure of which is easy to change, and a sealed battery having the sealing body.

Solution to Problem

The present invention relates to a sealing body for a sealed battery includes a conductive terminal cap, a conductive explosion-proof valve electrically connected to the terminal cap, a conductive terminal plate having an abutting surface abutting the explosion-proof valve, and an insulating plate disposed between the explosion-proof valve and the terminal plate. A welded part between the explosion-proof valve and the terminal plate is formed in the inner part of the abutting surface, and the plan-view shape of the welded part is a shape defining an enclosed region, a C-shape, or a spiral shape. A notch part surrounding the welded part is formed in the terminal plate. The breaking pressure of the welded part is higher than the breaking pressure of the notch part.

The above wording "the breaking pressure of the welded part is higher than the breaking pressure of the notch part" means that, when the pressure in the battery increases, the notch part breaks first. That is, in the present invention, the breaking pressure of the notch part corresponds to the current cutoff pressure.

In the present invention, it is preferable to use a high energy ray to form the welded part. The reason is that using a high energy ray facilitates making the plan-view shape of the welded part a shape defining a closed region, a C-shape, or a spiral shape.

Further, the present invention relates to a sealed battery having the above sealing body.

Advantageous Effects of Invention

According to the present invention, when the pressure in the battery reaches a predetermined value, the notch part of the terminal plate breaks to cut off the current. Therefore, variation in breaking pressure can be reduced. According to the present invention, by analogously changing the shape of the welded part between the explosion-proof valve and the terminal plate, the breaking pressure of the notch part, that is, the current cutoff pressure can be changed. That is, according to the present invention, the need to change the residual wall thickness of the notch part of the terminal plate for each use of the sealed battery is eliminated, and therefore the manufacturing process of a sealed battery can be simplified and the manufacturing cost can be reduced.

DESCRIPTION OF EMBODIMENTS

Figure 1:
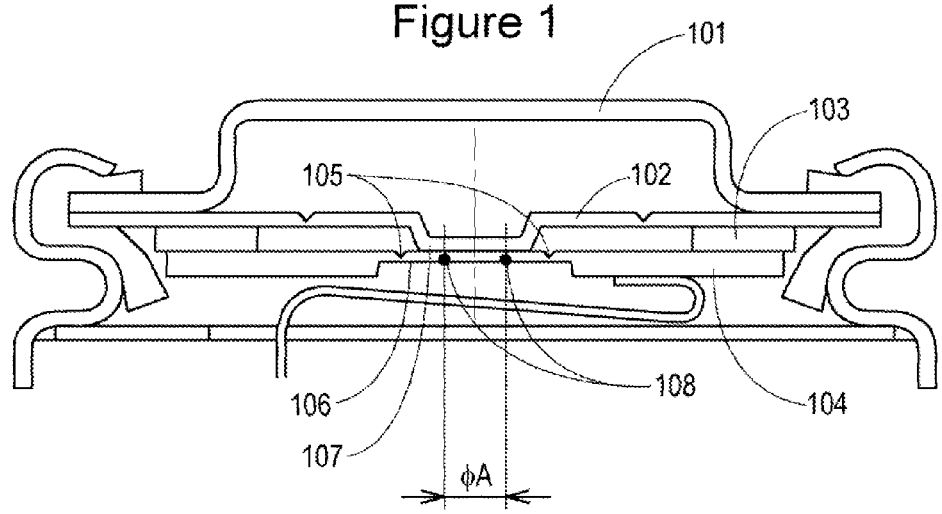
FIG. 1 is a sectional view of a sealing body according to an experimental example.

Although the embodiment of the present invention will be described below, the present invention is not limited to the following embodiment, and various changes may be made without departing from the scope of the present invention.

In the present invention, an explosion-proof valve has the function of breaking when the pressure in a battery reaches a predetermined value, and discharging gas in the battery. Therefore, the explosion-proof valve is preferably made of flexible metal, for example, aluminum or aluminum alloy. A terminal plate welded to the explosion-proof valve is also preferably made of aluminum or aluminum alloy. To form a welded part on the abutting surface between the explosion-proof valve and the terminal plate, ultrasonic welding or welding by a high energy ray can be used. In the present invention, because a thin notch part is formed in the terminal plate, welding by a high energy ray is preferably used. Both an electron beam and laser light can be used as a high energy ray. To form the abutting surface between the explosion-proof valve and the terminal plate, it is preferable to provide at least one of the explosion-proof valve and the terminal plate with a protruding part protruding toward the abutting surface.

In the present invention, the notch part formed in the terminal plate can be formed by press working. The plan-view shape of the notch part is preferably formed so as to surround the welded part between the explosion-proof valve and the terminal plate. The notch part need not completely surround the welded part, and the notch part can have a shape such as a C-shape. However, it is most preferable that the shape of the notch part conform to the outline of the welded part. If the notch part has such a shape, the distance from the outline of the welded part to the notch part is uniform. Therefore, when the shape of the welded part is analogously changed, the correlativity between the amount of change thereof and the amount of change of the breaking pressure of the notch part increases, and the adjustment of breaking pressure is facilitated. The cross-sectional shape of the notch part is not particularly limited, but is preferably a V-shape or a U-shape. The notch part may be formed in the battery inner side surface or the battery outer side surface of the terminal plate, but is preferably formed on the battery outer side.

In the present invention, the "shape defining an enclosed region" is not particularly limited. Preferable examples thereof include a circular shape, an elliptical shape, and a polygonal shape. Among them, a circular shape is the most preferable as the shape of the welded part. The plan-view shape of the welded part between the explosion-proof valve and the terminal plate may be a C-shape or a spiral shape. These shapes and the above shape defining a closed region have in common the tact that they are shapes drawn with a single line and are two-dimensional shapes. Whatever the shape is, the advantageous effects of the present invention are obtained. This point will be described later in detail together with the result of an experimental example.

In the present invention, a terminal cap and the explosion-proof valve are electrically connected to each other. Because the terminal cap and the explosion-proof valve are both formed of conductive material, these need only be physically an contact, with each other. When the terminal cap and the explosion-proof valve are both formed of metal material, they can be welded with a high energy ray. The electric resistance between the terminal cap and the explosion-proof valve can thereby be reduced.

In the present invention, to cut off the current flowing between the explosion-proof valve and the terminal plate when the notch part formed in the terminal plate breaks, an insulating plate is disposed between the explosion-proof valve and the terminal plate. The shape of the insulating plate is not particularly limited, but is preferably an annular shape having an opening in the center thereof. If the insulating plate has such a shape, parts other than the abutting surface can be surely insulated while disposing the abutting surface between the explosion-proof valve and the terminal plate within the opening of the insulating plate. A PTC element can be disposed between the terminal cap and the explosion-proof valve. The safety of the sealed battery can thereby be further improved.

Sealed batteries according to the present invention include aqueous sealed batteries typified by nickel-cadmium batteries and nickel-metal-hydride batteries, and non-aqueous sealed batteries typified by lithium-ion batteries.

The embodiment of the present invention will be described more specifically using an experimental example that is an embodiment of the present invention described in FIG. 1.

A sealing body according to this experimental example consists of a terminal cap 101 made of nickel-plated iron, an explosion-proof valve 102 made of aluminum, an insulating plate 103 having an opening, and a terminal plate 104 made of aluminum.

Figure 2:
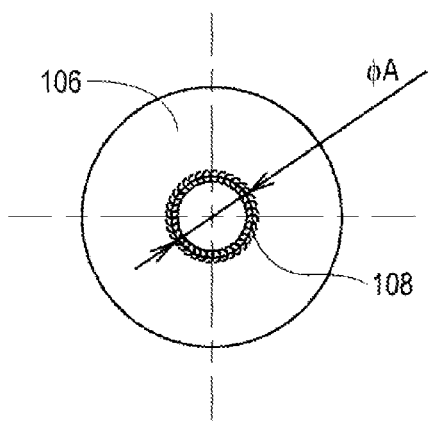
FIG. 2 is a plan view of the sealing body according to the experimental example seen from the inside of the battery (only the thin part of the terminal plate is shown).

The terminal cap 101 has a protruding part protruding toward the outside of the battery, and a flange part disposed around it. The flange pan and the explosion-proof value 102 are welded with laser light. The explosion-proof valve 102 and the terminal plate 104 are welded in the inner part of an abutting surface 107 formed within the opening of the insulating plate 103. To form this abutting surface 107, a protruding part having a diameter of 2 mm is formed in the center of the explosion-proof valve 102. The thickness of the terminal plate 104 is 0.5 mm, and a thin part 106 having a thickness of 0.15 mm is formed near the abutting surface 107 abutting the explosion-proof valve 102. In the inner part of the abutting surface 107 between the explosion-proof valve 102 and the terminal plate 104, a welded part 108 the plan-view shape of which is circular is formed with laser light as shown in FIG. 2. The terminal plate 104 has, around the welded part 108, a notch part 105 the plan-view shape of which is circular. This notch part 105 is formed such that the residual wall thickness is 60 μm and the cross-sectional shape is a V-shape.

Figure 3:
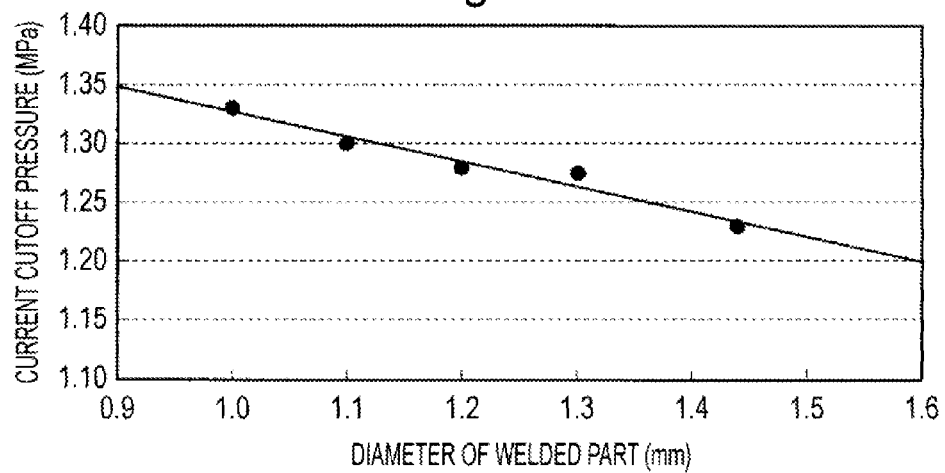
FIG. 3 is a correlation diagram between the diameter of the welded part formed on the terminal plate according to the experimental example and the current cutoff pressure.

Sealing bodies were made such that the diameters of the circular welded part 108 formed in the inner part of the abutting surface 107 between the explosion-proof valve 102 and the terminal plate 104 were 1 mm, 1.1 mm, 1.2 mm, 1.3 mm, and 1.44 mm. 30 sealing bodies were made for each diameter. In FIG. 1 and FIG. 2, the diameter of the welded part 108 is denoted by φA. The current cutoff pressures of thus made sealing bodies were measured, and the average value of current cutoff pressures was calculated for each diameter of the welded part 108. FIG. 3 shows the correlation between the diameter of the welded part 108 and the average value of current cutoff pressure.

It can be seen that, when welding the explosion-proof valve 102, and the terminal plate 104 in which the notch part 105 is formed, as in this experimental example, by making the plan-view shape of the welded part 108 circular, the current cutoff pressure can be changed without changing the residual wall thickness of the notch part 105, just by changing the diameter of the welded part 108. The result shown in FIG. 3 suggests that the distance from the welded part 108 to the notch part 105 is a parameter influencing the current cutoff pressure. Therefore, if the plan-view shape of the welded part 108 is a closed shape, by analogously changing that shape, the distance from the outline of the plan-view shape of the welded part 108 to the notch part 105 changes uniformly, and therefore the advantageous effects of the present invention are obtained. If the plan-view shape of the welded part 108 is a C-shape and a spiral shape, by analogously changing those shapes, the distance from the outline of the plan-view shape of the Welded part 108 to the notch part 105 changes uniformly and therefore the advantageous effects of the present invention are obtained.

INDUSTRIAL APPLICABILITY

As described above, according to the present invention, the current cutoff pressure can be changed just by changing not the thickness of a notch part of a terminal plate but conditions of welding between an explosion-proof valve and the terminal plate, and therefore the manufacturing process can be simplified and the manufacturing cost can be reduced. Therefore, the industrial applicability of the present invention is high.

REFERENCE SIGNS LIST 101 terminal cap
102 explosion-proof valve
103 insulating plate
104 terminal plate
105 notch part
106 thin part
107 abutting surface
108 welded part
ϕA diameter of welded part

The invention claimed is:

1. A sealing body for a sealed battery comprising: a conductive terminal cap; a conductive explosion-proof valve electrically connected to the terminal cap; a conductive terminal plate having an abutting surface abutting the explosion-proof valve; and an insulating plate disposed between the explosion-proof valve and the terminal plate,
   wherein a welded part between the explosion-proof valve and the terminal plate is formed in the inner part of the abutting surface, and the plan-view shape of the welded part is a shape defining an enclosed region,
   wherein a notch part surrounding the welded part is formed in the terminal plate, and
   wherein the breaking pressure of the welded part is higher than the breaking pressure of the notch part.

2. The sealing body for a sealed battery according to claim 1, wherein the plan-view shape of the welded part is circular.

3. A sealing body for a sealed battery comprising: a conductive terminal cap; a conductive explosion-proof valve electrically connected to the terminal cap; a conductive terminal plate having an abutting surface abutting the explosion-proof valve; and an insulating plate disposed between the explosion-proof valve and the terminal plate,
   wherein a welded part between the explosion-proof valve and the terminal plate is formed in the inner part of the abutting surface, and the plan-view shape of the welded part is a C-shape or a spiral shape,
   wherein a notch part surrounding the welded part is formed in the terminal plate, and
   wherein the breaking pressure of the welded part is higher than the breaking pressure of the notch part.

4. The sealing body for a sealed battery according to claim 1, wherein the welded part is formed with a high energy ray.

5. A sealed battery comprising the sealing body for a sealed battery according to claim 1.

6. The sealing body for a sealed battery according to claim 2, wherein the welded part is formed with a high energy ray.

7. The sealing body for a sealed battery according to claim 3, wherein the welded part is formed with a high energy ray.

8. A sealed battery comprising the seating body for a sealed battery according to claim 2.

9. A sealed battery comprising the sealing body for a sealed battery according to claim 3.

10. A sealed battery comprising the sealing body for a sealed battery according to claim 4.

11. A sealed battery comprising the sealing body for a sealed battery according to claim 6.

12. A sealed battery comprising the sealing body for a sealed battery according to claim 7.

* * * * *